(12) United States Patent
Tamez et al.

(10) Patent No.: US 7,171,289 B1
(45) Date of Patent: Jan. 30, 2007

(54) TRAILER TANDEM ADJUSTMENT INDICATION APPARATUS

(76) Inventors: Cesar Tamez, 208 Oriente St., Edinburg, TX (US) 78541; Jose O. Tamez, P.O. Box 935, Elsa, TX (US) 78543

( * ) Notice: Subject to any disclaimer, the term of this patent is extended or adjusted under 35 U.S.C. 154(b) by 23 days.

(21) Appl. No.: 10/858,735

(22) Filed: Jun. 2, 2004

(51) Int. Cl.
*G06F 19/00* (2006.01)

(52) U.S. Cl. .............................. 701/1; 701/50; 340/431

(58) Field of Classification Search ..................... None
See application file for complete search history.

(56) References Cited

U.S. PATENT DOCUMENTS

| | | | | |
|---|---|---|---|---|
| 4,353,565 A | * | 10/1982 | Smith et al. | ............. 280/149.2 |
| 5,476,277 A | * | 12/1995 | Schueman | ............... 280/149.2 |
| 5,617,072 A | | 4/1997 | McNeal | |
| 5,716,071 A | * | 2/1998 | Stanley et al. | ........... 280/407.1 |
| 6,354,642 B1 | | 3/2002 | Haggerty | |
| 6,921,100 B2 | * | 7/2005 | Mantini et al. | ............. 280/407 |

* cited by examiner

*Primary Examiner*—Michael J. Zanelli
(74) *Attorney, Agent, or Firm*—Michael O. Scheinberg; Hilgers, Bell & Richards LLP

(57) ABSTRACT

An alignment indication apparatus is provided that indicates whether a selected position of a first portion of a trailer is aligned with a selected position of a second portion of the trailer. The first and second portions are adjustably moveable relative to one another. In one embodiment, the apparatus includes a universal mounting assembly, a sensor, a trigger element, and an indicator. The universal mounting assembly is adapted to be rigidly mounted to the first trailer portion proximal to the selected position of the first portion. The sensor is adjustably mounted to the universal mounting assembly. The trigger element is adapted to adhere to the selected position of the second trailer portion. The indicator indicates to a user when the sensor is aligned with the trigger element thereby indicating when the selected position of the first trailer portion and selected position of the second trailer portion are aligned with one another.

19 Claims, 5 Drawing Sheets

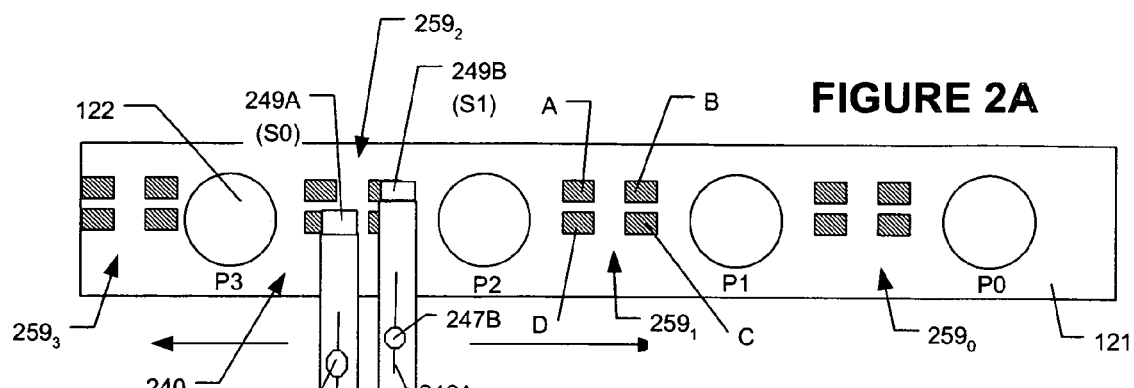
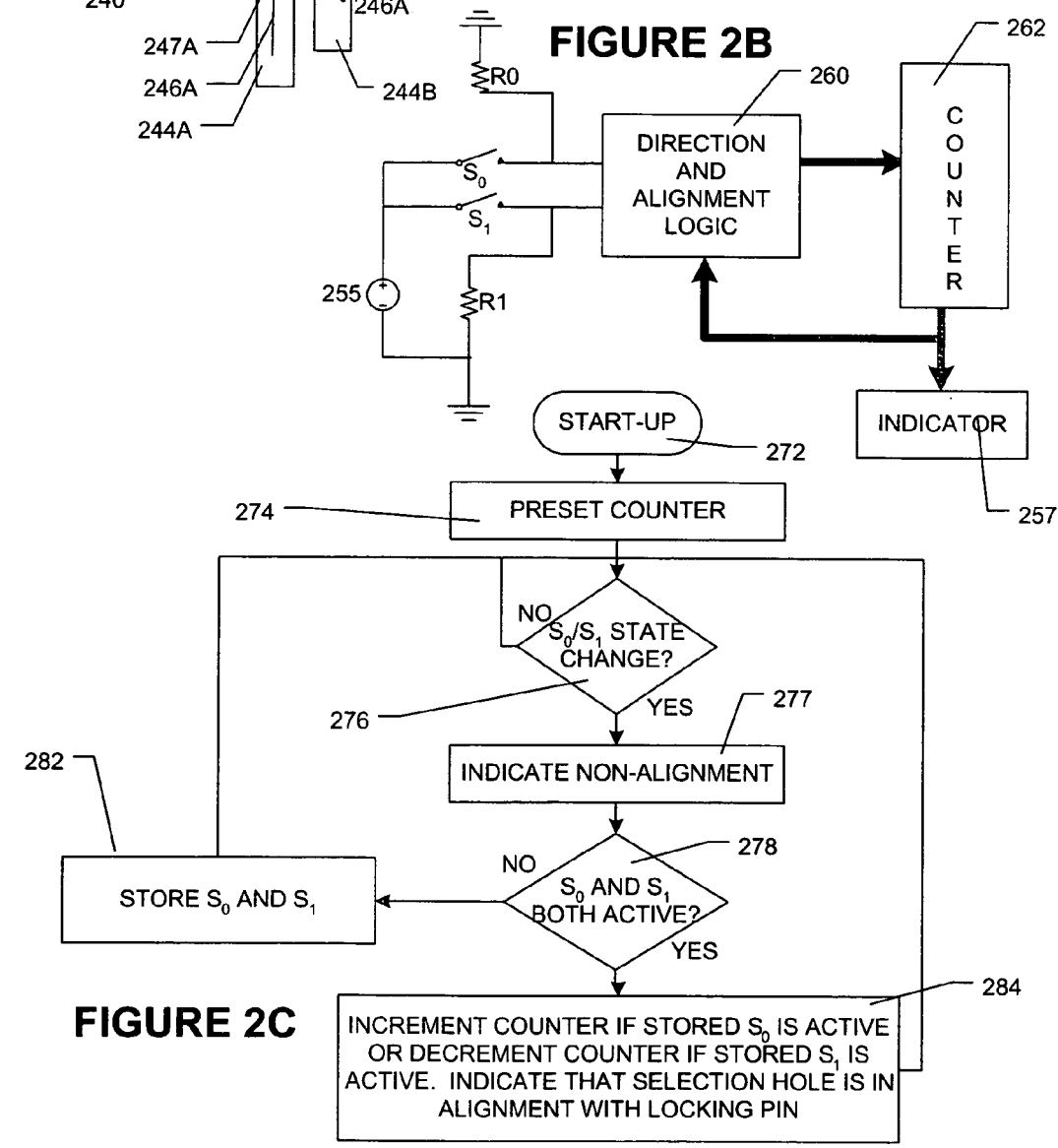

TRAILER TANDEM ADJUSTMENT INDICATION APPARATUS

BACKGROUND

In the trucking and heavy equipment industry, particularly in the tractor-trailer vehicle industry, loads of various sizes and weights must be handled. Accordingly, various types of trailers and specialized trailing implements have been utilized to handle such loads. Furthermore, vehicle operators must comply with specific laws governing the permissible weight of vehicles that travel on freeways and highways. Typically such laws specify the maximum allowable weight per axel of the vehicle. To facilitate compliance with these laws, the trucking industry has long since developed various adjustable frame components to change the weight distribution on the vehicle axels and bring the vehicle into compliance with weight laws.

Many traditional trailers utilize a tandem axel frame assembly which nests inside the main frame assembly of the trailer. The tandem axel frame assembly is moveable relative to the main frame assembly to change the position of the tandem axels relative to the main trailer frame. Changing the position of the tandem axels varies the distribution of weight on all of the vehicle axels.

Operators of tractor-trailer vehicles must frequently change the position of the trailer tandem axels relative to the trailer frame to comply with the particular vehicle weight laws. Several changes may be required during a single trip where the load is sequentially reduced. The weight distribution will change for a given amount of movement of the tandem axel relative to the other portions of the vehicle. To change the position of the tandem axels of the trailer, a mechanical locking pin which holds the tandem axel frame in place relative to the main trailer frame must be released, typically, with the operator having to depart from the cab to manually release it. The operator then re-enters the cab portion of the vehicle and inches the vehicle forward or backward while maintaining the tandem axels in the same place. The operator while in the cab is required to guess as to how much movement of the vehicle will result in the desired amount of relative frame movement. After making an initial guess, the operator is required to climb out of the vehicle cab to observe the actual amount of frame movement, and then reenter the vehicle cab to make further adjustments.

Accordingly, there is a need for a device to assist vehicle operators, including but not limited to tractor-trailer vehicle operators, in adjusting the relative position of a tandem assembly.

SUMMARY OF THE INVENTION

An alignment indication apparatus is provided that indicates whether a selected position of a first portion of a trailer is aligned with a selected position of a second portion of the trailer. The first and second portions are adjustably moveable relative to one another. In one embodiment, the apparatus includes a universal mounting assembly, a sensor, a trigger element, and an indicator. The universal mounting assembly is adapted to be rigidly mounted to the first trailer portion proximal to the selected position of the first portion. The sensor is adjustably mounted to the universal mounting assembly. The trigger element is adapted to adhere to the selected position of the second trailer portion. The indicator indicates to a user when the sensor is aligned with the trigger element thereby indicating when the selected position of the first trailer portion and selected position of the second trailer portion are aligned with one another.

The foregoing has outlined rather broadly some of the features and technical advantages of the present invention in order that the detailed description of the invention that follows may be better understood. Additional features and advantages of the invention will be described hereinafter. It should be appreciated by those skilled in the art that the conception and specific embodiment disclosed may be readily utilized as a basis for modifying or designing other structures for carrying out the same purposes as the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, the following description is made with reference to the accompanying drawings, in which:

FIG. 2A shows an isometric view of yet another embodiment of a tandem adjustment apparatus.

FIG. 2B shows a circuit for implementing the tandem adjustment apparatus of FIG. 2A.

FIG. 2C shows a routine for implementing a logic block in the circuit of FIG. 2B.

DETAILED DESCRIPTION

Figure 1A:
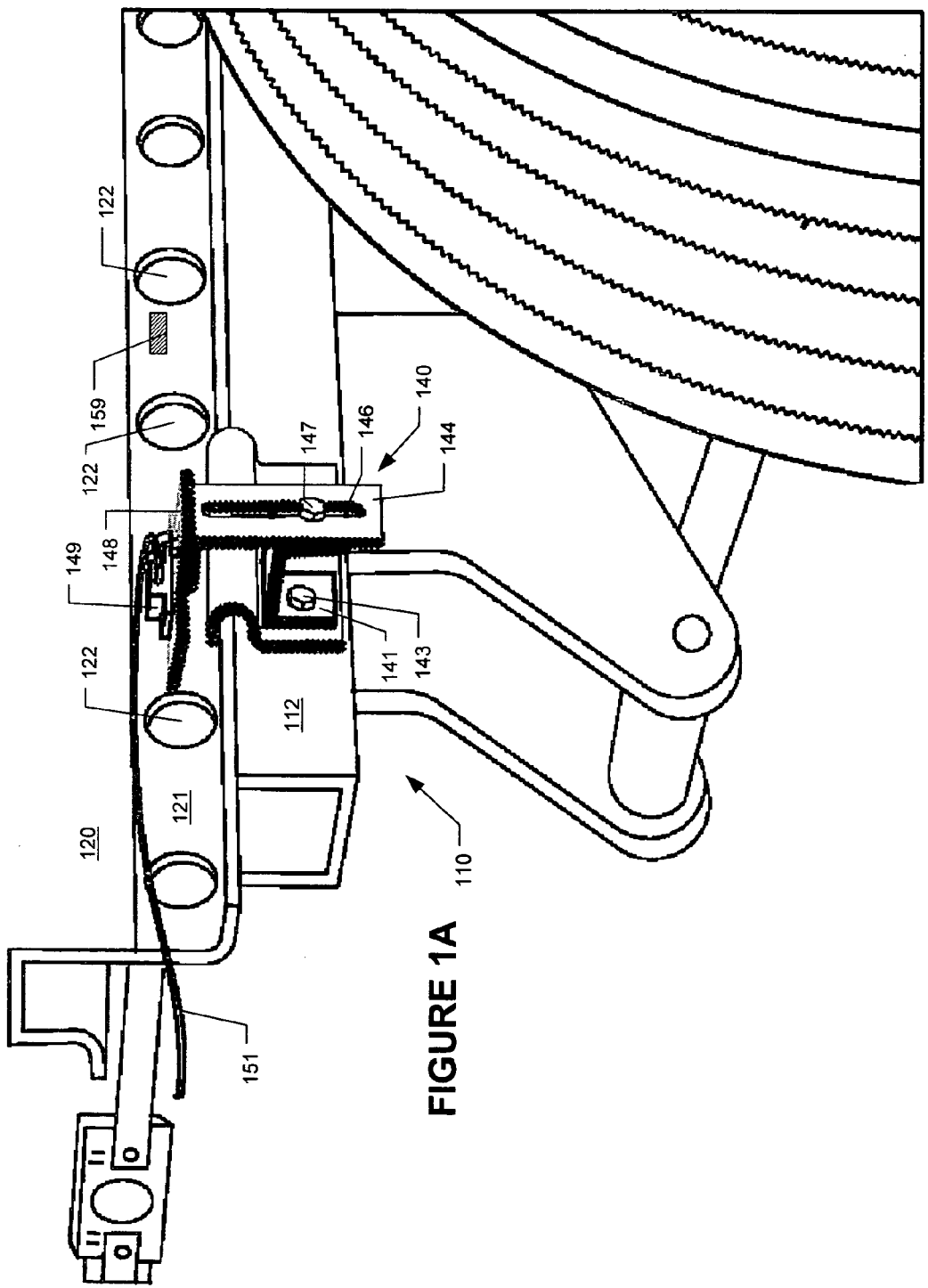
FIG. 1A is an isometric view of a tandem adjustment apparatus mounted to a tractor-trailer vehicle.
Figure 1B:
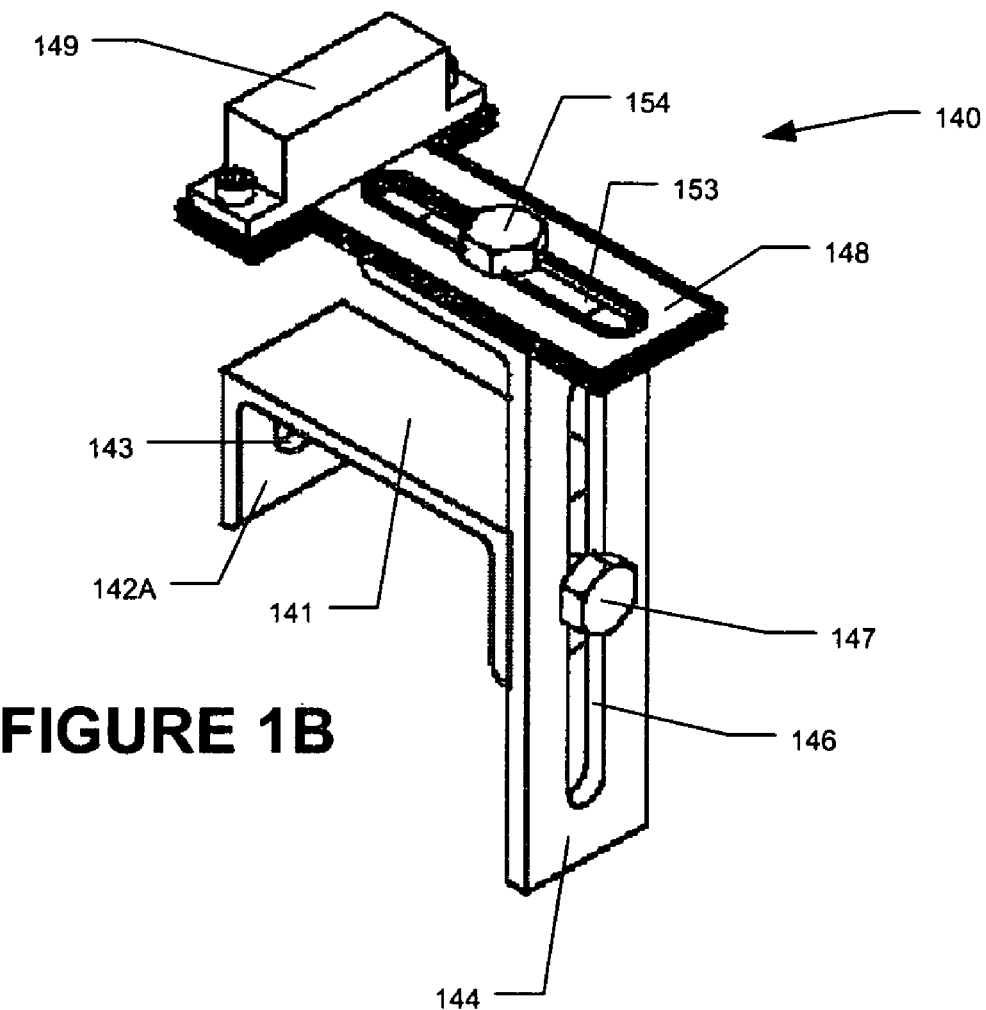
FIG. 1B is a perspective view of the tandem adjustment apparatus of FIG. 1A.

With reference to FIGS. 1A to 1D, one embodiment of a tandem adjustment indication apparatus 140 is depicted. The adjustment apparatus 140 is shown rigidly secured to a portion of track member 112 of a tandem axel frame assembly (tandem assembly) 110. A main trailer assembly 120 is movable relative to the tandem assembly 110 to adjust the weight distribution among the axels of the trailer. The tandem assembly 110 is mounted for sliding movement relative to the main trailer frame 120. A conventional, adjustable slide rail 121 extending from the main trailer assembly 120 is supported by the tandem assembly 110 through track member 112 and allows for sliding movement between the tandem assembly 110 and the main trailer assembly 120. Slidable rail member 121 has a plurality of adjustment holes 122, one of which is selectively engaged by a locking pin (not shown) operable to lock the trailer frame 120 in position relative to the tandem axle assembly 110. A lever (not shown) is typically used to move the locking pin between extended and retracted positions by means of a conventional linkage assembly, although some tractor/trailers have automated pin engagement/release systems that allow for remote operation from within the cab.

The adjustment indication apparatus 140 generally includes an alignment sensor 149 working in cooperation with a positionally adjustable trigger element 159. The depicted alignment sensor 149 is mounted to the tandem assembly 110 with a universal mounting assembly, which in the depicted embodiment includes brackets 141 and 144, along with sensor slide plate 148. Bracket 141 is a U-shaped bracket with spaced apart legs 142A and 142B. Bracket leg 142A mounts at a desired portion of track member 112 with a conventional nut/bolt fastener 143. The other leg, 142B, adjustably mounts with bracket 144, which is an L-shaped bracket that has vertical and horizontal leg portions. The vertical leg portion has an adjustment slot 146 for adjustably mounting the L-bracket 144 to bracket leg 142B with nut and bolt combination 147. The horizontal portion supports and mounts sensor slide plate 148, which has an adjustment slot 153 for adjustably mounting the slide plate 148 to the horizontal leg portion with nut and bolt combination 154. The sensor 149 is rigidly mounted to slide plate 148 making it slidably mounted to bracket 144. The use of the depicted mount assembly with separate, independently adjustable slots 146 (up/down adjustment) and 153 (toward/away) allows for sensor 149 to be securably and operably mounted to almost any type of adjustable tandem/main trailer assembly. That is, the bracket assembly is rigidly mounted to the tandem assembly 110 and at the same time, the sensor 149 can be flexibly adjusted with reasonable precision in order for it to cooperatively operate with trigger element 159, regardless of its placed position, to indicate when a selected position has been attained. Such a secure mount can be important considering the normal wear and tear subjected to a trailer under normal operating conditions, and at the same time, the design is simple enough allowing for mounting ease with a variety of different tandem/trailer frame configurations.

Figure 1D:
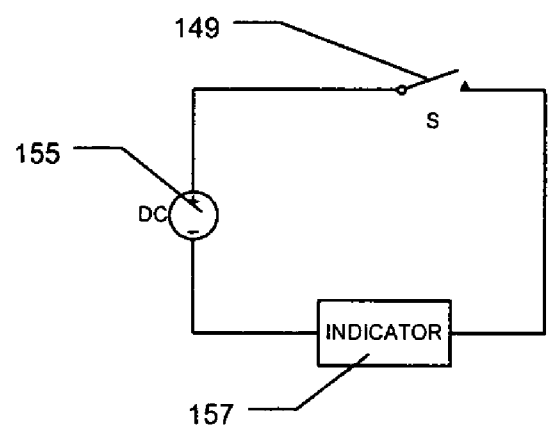
FIG. 1D shows a circuit used to implement the tandem adjustment apparatus of FIGS. 1A to 1C.
Figure 1C:
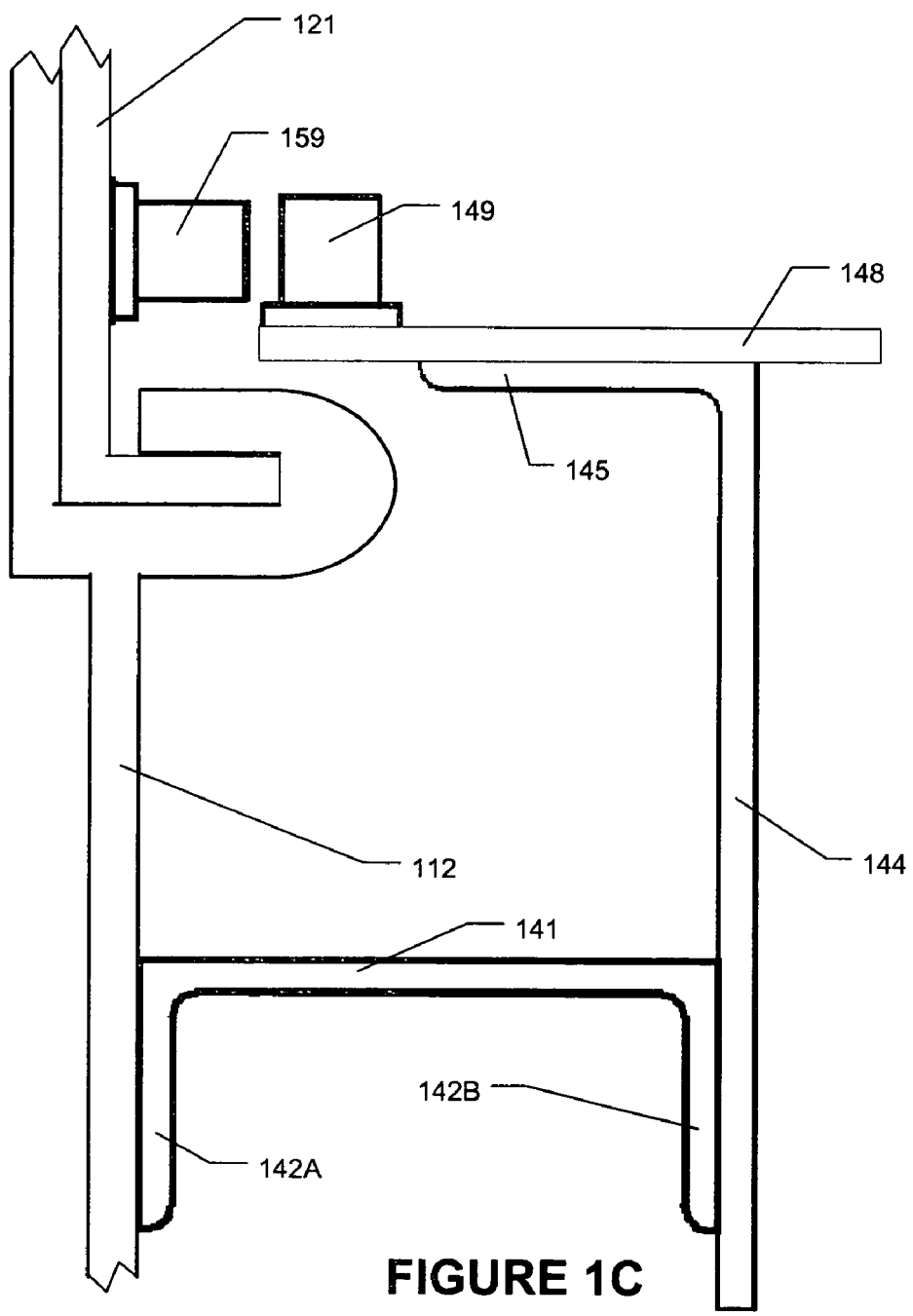
FIG. 1C is a side view of the tandem adjustment apparatus of FIGS. 1A and 1B.

In the depicted embodiment, alignment sensor 149 is a conventional reed switch with trigger element 159 being a magnet for closing the reed switch sensor when it is aligned with it. FIG. 1D is a schematic showing the electrical configuration for operating the reed switch 149. Switch 149 is connected in series with an indicator 157 such as a light and a power source 155, e.g., from the vehicle's electrical DC power source. In the depicted embodiment, the sensor 149 and indicator 157 tap power via electrical line 151 from the main running light circuit on the trailer. The indicator is either mounted on the side of the trailer or is electrically routed back to the tractor and mounted in the cab.

In operation, when the tandem position is to be changed, the operator positions magnet trigger 159 next to a desired hole 122 for engagement with the locking pin, and the pin lever is actuated to release the locking pin. After securing the tandem wheels, the operator enters the cab of the vehicle and moves the vehicle such that the trailer frame 120 moves relative to the tandem frame assembly 110. As the reed switch 149 passes by the magnet 159, the reed switch 149 is actuated to close the electric circuit which, in turn, energizes the indicator 157. The indicator 157 thereby signals the vehicle operator that proper positioning has been accomplished. The vehicle driver can then actuate the lever to force the locking pin through the selected adjustment hole to lock the main trailer frame 120 in position relative to tandem assembly 110.

Figure 1E:
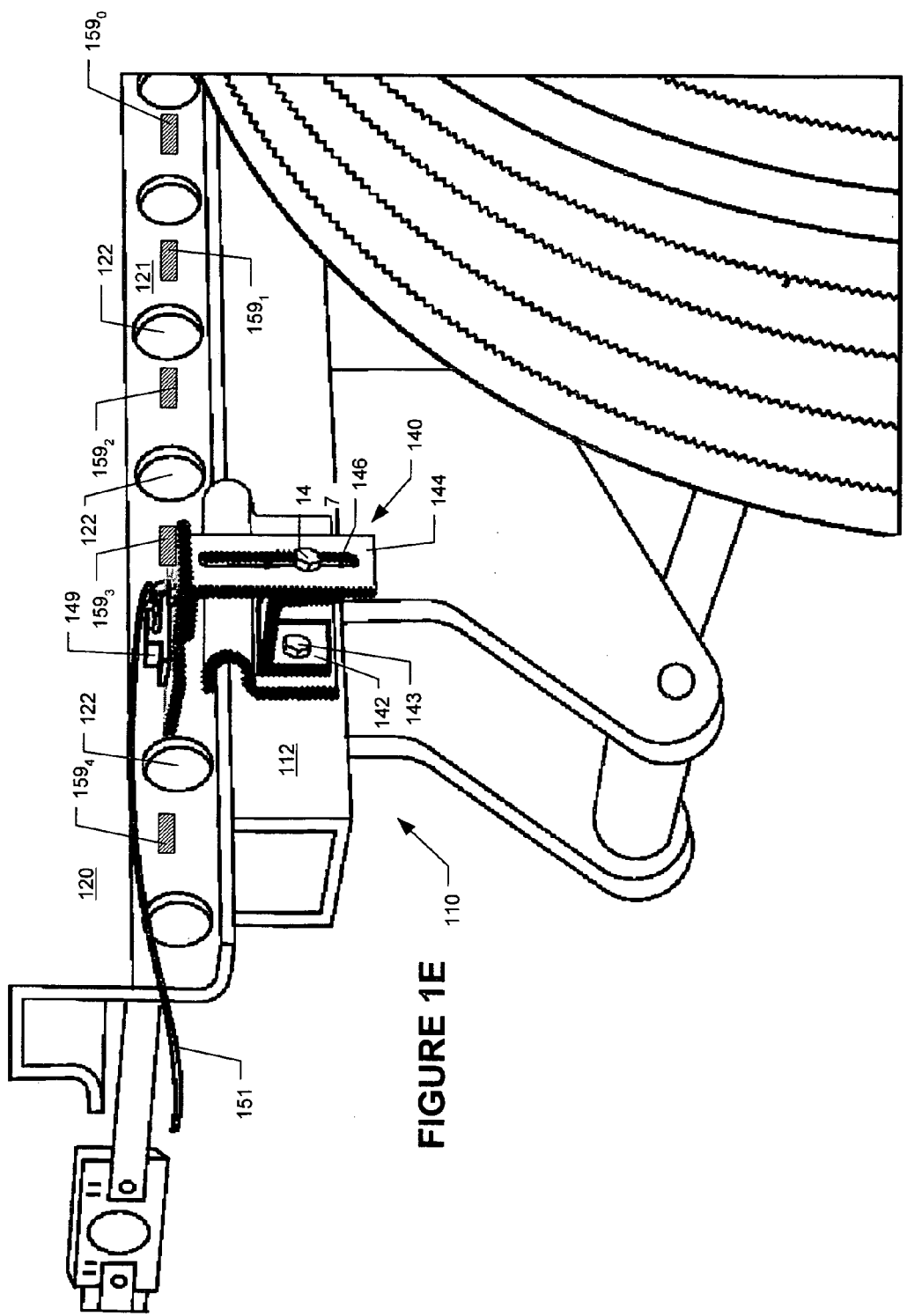
FIG. 1E shows an isometric view of another embodiment of a tandem adjustment apparatus.

FIG. 1E shows another configuration for utilizing indication apparatus 140. In this embodiment, multiple, fixed trigger elements 159 ($159_0$, $159_1$, etc.) are used instead of a single, re-positionable trigger element. Each trigger element 159 is mounted next to an adjustment hole 122. In this way, the operator need not have to re-position a single trigger element next to a desired hole location. When the trailer frame 120 is moved relative to the tandem assembly 110, the operator monitors the indicator 157 and can count each time the sensor 149 passes by a trigger. In this way, he/she can count until a desired position is achieved. This works especially well when a cab-operable pin release mechanism is used, which allows the operator to remain in the cab for the entire tandem assembly adjustment operation.

With reference to FIGS. 2A to 2C, another embodiment of an alignment indication apparatus 240 is shown. With this embodiment, the actual hole location of the locking pin is tracked and conveyed to the operator with an indicator 257, such as an LCD device, thereby eliminating the need for the operator to "count" hole progression as the tandem position is being adjusted. Dual sensors 249A, 249B are used in cooperation with a plurality of trigger arrays $259_i$ ($259_0$ through 2593 appear in this figure), which are positioned next to each adjustment hole 122 on rail member 121. The dual sensors 249A, 249B are mounted using similar mount structures as previously discussed. They are positioned next to each other but vertically offset from one another.

Each depicted trigger array ($259_0$ to $259_3$) has four trigger elements (A, B, C, D) positioned in a 2×2 matrix configuration next to an adjustment hole 122. The sensors 249A, 249B are positioned so that one is aligned with the lower array elements (C, D), while the other sensor is aligned with the up-per elements (A, B). In this way, one of the sensors initially aligns with a sensor depending upon the direction that the sensors 249A, 249B move relative to rail 121. At the same time, regardless of adjustment direction, the sensors 249A, 249B eventually align with an associated sensor (A, C) when an adjustment hole 122 is aligned with the locking pin. This sensor/trigger configuration allows for circuitry (discussed below) to count upward and downward for tracking the particular hole that is in alignment with the locking pin.

With reference to FIG. 2B, a circuit used for tracking adjustment hole position for the sensor configuration of FIG. 2A is shown and will now be discussed. (A module for implementing this circuit is not shown but can be mounted proximal to the sensor devices 249A, 249B, in the cab, or in some other suitable location on the trailer or tractor.) The circuit diagram of FIG. 2B includes a power source 255, sensor switches $S_0$, $S_1$ (249A, 249B), pull-down resistors R0, R1, direction and alignment logic block 260, up/down counter 262, and indicator device 257. Sensor switch 249A ($S_0$) is connected between power source 255 and pull-down resistor R0, which is grounded at its other end. Similarly, sensor switch 249B ($S_1$) is connected between power source 255 and pull-down resistor R1, which is also grounded at its other end. Besides being connected to their respective resistors, the switch outputs are also connected as inputs to the logic block 260. They provide to the logic block digital input signals indicating whether or not the sensor switches are in alignment with a trigger element within a trigger array $259_i$. In turn, the logic block 260 is connected to counter 262, providing it with control and data signals for pre-setting, incrementing, and decrementing its count value, which corresponds to the position of the sensors and thus the position of the adjustment rail 121 relative to the tandem assembly 110. The counter is connected to the indicator device 257 for providing it with the count value for display to the vehicle operator. The counter 262 is also connected back to the logic block to provide it with the count value for tracking and storage during shut down.

The power source 255 provides sufficient power for powering the circuit elements and also may source additional voltage regulation devices to provide suitable voltage values at the switch outputs when the switches are closed for the logic block 260. Thus, when the switches are closed, they provide a logical High input to the logic block 260. Conversely, when open, they provide a logical Low input to the logic block 260.

In this embodiment, counter 262 is a conventional up/down counter that can be preset to output a desired count value and can count upward (incremented) or counted downward (decremented) with appropriately applied signal inputs. The indicator 257 can be any suitable indicator for displaying the lock pin position within rail member 121. For example, it may be an LCD display that identifies hole position, as well as whether or not the hole is aligned with the locking pin.

The logic block may comprise any suitable device (or device combination) for properly controlling the counter 262 based on inputs from the switch sensors 249A, 249B in order to track the position of the slide rail 121 relative to the locking pin. For example, it could comprise an integrated circuit such as an ASIC (application specific integrated circuit), a PLD (programmable logic device) or a combination of integrated circuits and/or discrete components for implementing a logic circuit such as a sequential logic circuit for determining the direction of the adjustment indication apparatus 240 as it moves relative to the slide rail 121 and whether both sensors are aligned with the A and C triggers within a trigger array $259_i$.

One embodiment of a functional flow routine to be implemented by logic block 260 is shown in FIG. 2C for performing the afore mentioned functions. After the circuit is activated at start-up (272), the counter 262 is preset (step 274) with a value set by the operator or with a stored value from the locator assembly's last position. At 276, the circuit monitors for a change in the state of switches $S_0/S_1$. If neither switch changes state, it loops back upon itself until either switch or both switches change. Once a switch changes, then at step 277, it ensures that indicator 257 does not indicate that a selection hole 122 is aligned with the lock pin. This is relevant when a selection hole 122 is moved out of alignment. From here, at step 278, it determines if both of the switches are closed indicating that a selection hole is aligned with the locking pin. If only one of the switches is closed, at step 282 it stores the values of $S_0$ and $S_1$ so that once both are closed, it can determine the relative direction of sensor motion in order to properly increment or decrement the count. For example, with this embodiment, if $S_0$ is active with $S_1$ being inactive, the logic block would know that the sensors are moving leftward (on the page), so it would increment the count since it is moving from a lower position to a higher value position. (Of course, these designations are relative, needing only to be consistent and meaningful to an operator.) Returning back to decision step 278, if it is determined that both switches are closed, then at step 284, it increments or decrements the count based on the presently stored values of $S_0$ and $S_1$ as just discussed. It also indicates through indicator 257 that a selection hole (e.g., P0, P1, P2, P3) is aligned with the locking pin. From here, it returns to decision step 276 where it once again waits for another $S_0/S_1$ state change.

Although the invention has been described with reference to specific examples, it would be appreciated by those skilled in the art that the invention may be embodied in many other forms. For example, the alignment indication apparatus is not limited to embodiments with reed switches and magnet trigger elements; rather, any suitable sensor device such as optical sensors or MR devices could also be used. In addition, while the described position monitoring embodiment uses a counting scheme, which enables position monitoring using reliable, inexpensive components, other position monitoring approaches could also be used within the teachings of this disclosure. For example, instead of using trigger arrays at each hole position, bar code or magnetic strip identifiers could also be used with appropriate, cooperating sensor devices to monitor lock pin position and confirm hole alignment.

We claim as follows:

1. An alignment indicator apparatus for indicating whether a selected position of a first portion of a trailer is aligned with a selected position of a second portion of the trailer the first and second portions being moveable relative to one another comprising:
    a universal mounting assembly adapted to be rigidly mounted to the first trailer portion;
    a sensor adjustably mounted to said universal mounting assembly, the sensor being slidably mounted on a rigid bracket to provide adjustment and a secure mount;
    a trigger element adapted to adhere to the second trailer portion; and
    an indicator for indicating to a user when the sensor is aligned with the trigger element thereby indicating when the selected position of the first trailer portion and selected position of the second trailer portion are aligned with one another.

2. The apparatus of claim 1, wherein the sensor is adjustable with the first trailer portion in at least two directions.

3. The apparatus of claim 2, wherein the at least two directions include first and second linear axes substantially perpendicular to one another.

4. The apparatus of claim 3, wherein the universal mounting assembly includes a first bracket for fixed mounting to the first trailer portion and a second bracket slidably mounted to said first bracket.

5. The apparatus of claim 4, further comprising a slide plate slidably mounted to the second bracket, the sensor being mounted to the slide plate.

6. The apparatus of claim 5, wherein the sensor is a reed switch, and the trigger element is a cooperating magnet capable of adherence with the selected position of the second trailer portion.

7. The apparatus of claim 1 wherein the universal mounting assembly is adapted to be fixedly mounted to a selected position on a tandem assembly and the trigger element is adapted to adhere to a selected position on a main trailer frame that is slidably adjustable relative to the tandem assembly.

8. The apparatus of claim 7, wherein the selected position on the tandem assembly is suitably aligned with a locking pin for securing the tandem assembly and main trailer frame in slidable position relative to one another.

9. The apparatus of claim 1, wherein the first portion is part of a main trailer frame, and the second portion is part of a tandem assembly that is slidable relative to the main trailer frame.

10. The alignment indicator apparatus of claim 1 in which the second portion of the trailer includes a rail having a plurality of adjustment holes, and in which the alignment indicator apparatus includes multiple magnetic trigger elements, at least some of the adjustment holes having a magnetic trigger element associated with the adjustment hole.

11. The alignment indicator apparatus of claim 10 in which the universal mounting assembly is adapted to be rigidly mounted proximal to the locking mechanism and in which each of the plurality of trigger elements are adapted to be mounted proximal to a selection option.

12. The alignment indicator apparatus of claim 1 in which the universal mounting assembly is adapted to be rigidly mounted to the first trailer portion proximal to the selected position of the first portion and in which the trigger element is adapted to adhere proximal to the selected position of the second trailer portion.

13. The alignment a indicator apparatus of claim 1 in which the universal mounting assembly comprises rigid components that can be adjusted relative to each other and locked into a configuration to position the sensor so that it can sense the trigger during operation.

14. A trailer comprising:
   a tandem assembly having a locking mechanism;
   a main trailer frame slidably adjustable relative to the tandem assembly, the main trailer frame having a member with a plurality of spaced apart lock portions for locking engagement with the locking mechanism;
   a mounting assembly mounted on a portion of the tandem assembly;
   a first sensor adjustably mounted to said mounting assembly, the sensor being slidably mounted on a rigid bracket to provide adjustment and a secure mount;
   a plurality of trigger elements each corresponding to a lock portion; and
   an indicator for indicating to a user when the first sensor is aligned with one of the plurality of trigger elements thereby indicating when the locking mechanism is operably aligned with a lock portion.

15. The trailer of claim 14, further comprising a second sensor mounted next to and above the first sensor and the plurality of trigger elements comprising a trigger element array mounted next to each lock portion thereby enabling the engaged position to be tracked and conveyed to a user.

16. The trailer of claim 14, wherein the trigger elements are mounted to the member.

17. The trailer of claim 14 in which the mounting assembly is mounted on a portion of the tandem assembly operably proximal to the locking mechanism and in which the plurality of trigger elements are each operably mounted proximal to each lock portion.

18. An alignment indicator apparatus for indicating whether a selected position of a first portion of a trailer is aligned with a selected position of a second portion of the trailer, the first and second portions being moveable relative to one another, the second portion of the trailer including a rail having a plurality of adjustment holes, comprising:
   a universal mounting assembly adapted to be rigidly mounted to the first trailer portion;
   a sensor adjustably mounted to said universal mounting assembly;
   multiple magnetic trigger elements adapted to adhere to the second trailer portion, at least some of the adjustment holes having a magnetic trigger element associated with the adjustment hole, with multiple trigger elements associated with at least one of the adjustment holes; and
   an indicator for indicating to a user when the sensor is aligned with one of the trigger elements thereby indicating when the selected position of the first trailer portion and selected position of the second trailer portion are aligned with one another.

19. An alignment indicator apparatus for indicating whether a selected position of a first portion of a trailer is aligned with a selected position of a second portion of the trailer, the first and second portions being moveable relative to one another, comprising:
   a universal mounting assembly adapted to be rigidly mounted to the first trailer portion;
   multiple, adjacently mounted sensors mounted to said universal mounting assembly
   multiple magnetic trigger elements adapted to adhere to the second trailer portion and associated with a single adjustment hole; and
   an indicator for indicating to a user when the sensor is aligned with the trigger element thereby indicating when the selected position of the first trailer portion and selected position of the second trailer portion are aligned with one another.

\* \* \* \* \*